(12) United States Patent
Long et al.

(10) Patent No.: US 11,536,350 B1
(45) Date of Patent: Dec. 27, 2022

(54) TENSIONING SYSTEMS AND METHODS (71) Applicant: Lennox Industries Inc., Richardson, TX (US)

(72) Inventors: Jacob Long, Irving, TX (US); Jeff Fontenault, McKinney, TX (US); Miguel Montemayor, Carrollton, TX (US)

(73) Assignee: Lennox Industries Inc.

( * ) Notice: Subject to any disclaimer, the term of this patent is extended or adjusted under 35 U.S.C. 154(b) by 0 days.

(21) Appl. No.: 17/359,881

(22) Filed: Jun. 28, 2021

(51) Int. Cl.
*F16H 7/08* (2006.01)
*F16H 7/12* (2006.01)

(52) U.S. Cl.
CPC .............. *F16H 7/08* (2013.01); *F16H 7/1209* (2013.01); *F16H 2007/0806* (2013.01); *F16H 2007/088* (2013.01); *F16H 2007/0865* (2013.01); *F16H 2007/0876* (2013.01); *F16H 2007/0891* (2013.01); *F16H 2007/0895* (2013.01); *F16H 2007/0897* (2013.01)

(58) Field of Classification Search
CPC ...... F16H 7/00; F16H 7/08; F16H 2007/0806; F16H 2007/0808; F16H 2007/0863; F16H 2007/0865; F16H 2007/087; F16H 2007/0876; F16H 2007/088; F16H 2007/0891; F16H 2007/0895; F16H 2007/0897; F16H 7/0829; F16H 7/0838; F16H 2007/084; F16H 7/10; F16H 7/1209; F16H 7/1245; F16H 7/1254; F16H 7/1263; F16H 7/1272; F16H 7/02; F16H 7/0848; F16H 7/12
See application file for complete search history.

(56) References Cited

U.S. PATENT DOCUMENTS

| | | | | |
|---|---|---|---|---|
| 879,328 A | * | 2/1908 | Schinner | F16H 7/1263 474/138 |
| 2,185,079 A | * | 12/1939 | Hall | F16H 7/06 474/134 |
| 3,691,860 A | * | 9/1972 | Danuser | F16H 7/02 474/135 |
| 3,746,413 A | * | 7/1973 | Nishikawa | F16D 1/0817 384/542 |
| 3,763,715 A | * | 10/1973 | Pollard | F16H 7/1263 474/137 |
| 3,926,063 A | * | 12/1975 | Mayfield | F16H 7/1254 474/132 |
| 4,317,599 A | * | 3/1982 | Anderson | F16C 33/6622 384/474 |

(Continued)

FOREIGN PATENT DOCUMENTS

| | | | | |
|---|---|---|---|---|
| DE | 202006019677 U1 | * | 5/2007 | ............ F16H 7/1263 |
| KR | 200298885 Y1 | * | 1/2003 | ............ F16H 7/1281 |

*Primary Examiner* — Michael R Mansen
*Assistant Examiner* — Raveen J Dias
(74) *Attorney, Agent, or Firm* — Shackelford, Bowen, McKinley & Norton, LLP (57) ABSTRACT

In an embodiment, a tensioning apparatus includes a housing and a fastener extending at least partially through the housing. The apparatus also includes a trolley adjustably positioned within the housing about the fastener. The apparatus also includes a pulley disposed outside the housing and coupled to the trolley, where the pulley moves in unison with the trolley along an opening in the housing.

16 Claims, 5 Drawing Sheets

(56) References Cited

U.S. PATENT DOCUMENTS

| | | | | |
|---|---|---|---|---|
| 4,413,982 A * | 11/1983 | Foster | F16H 7/1236 | 474/138 |
| 4,425,103 A * | 1/1984 | Foster | F16H 7/1236 | 474/138 |
| 4,458,403 A * | 7/1984 | Foster | F16H 7/1236 | 29/434 |
| 4,500,304 A * | 2/1985 | Foster | F16H 7/1236 | 474/138 |
| 4,583,961 A * | 4/1986 | Kawasawa | F16H 7/14 | 474/133 |
| 4,624,652 A * | 11/1986 | Foster | F16H 7/1236 | 474/135 |
| 4,634,408 A * | 1/1987 | Foster | F16H 7/1236 | 474/135 |
| 4,640,378 A * | 2/1987 | Dobberpuhl | B60K 17/28 | 180/53.7 |
| 4,708,697 A * | 11/1987 | Foster | F16H 7/1236 | 474/135 |
| 4,767,385 A * | 8/1988 | Wilson | F16H 7/1236 | 474/111 |
| 4,838,101 A * | 6/1989 | Dobberpuhl | B60K 25/02 | 474/136 |
| 4,969,859 A * | 11/1990 | Holbrook | F16H 7/1263 | 474/138 |
| 5,030,173 A * | 7/1991 | Bryant | B65G 23/44 | 474/138 |
| 5,254,046 A * | 10/1993 | Hohnl | A01D 43/077 | 474/101 |
| 5,938,551 A * | 8/1999 | Warner | F16H 7/1263 | 474/111 |
| 6,165,089 A * | 12/2000 | McGreal | F16H 7/1263 | 474/138 |
| 6,200,036 B1 * | 3/2001 | Girardey | B65G 23/44 | 384/260 |
| 6,743,132 B2 * | 6/2004 | Serkh | F16H 7/1218 | 474/136 |
| 7,909,717 B2 * | 3/2011 | Boussaguet | F16C 33/76 | 474/136 |
| 8,216,101 B2 * | 7/2012 | Numajiri | F16H 7/1263 | 474/138 |
| 10,384,879 B2 * | 8/2019 | German | B65G 39/09 | |
| 2002/0039943 A1 * | 4/2002 | Serkh | F16H 7/1263 | 474/134 |
| 2003/0004023 A1 * | 1/2003 | Hotta | F02B 67/06 | 474/136 |
| 2003/0109343 A1 * | 6/2003 | Martinson | F16H 7/1263 | 474/107 |
| 2003/0176250 A1 * | 9/2003 | Austin | F02B 67/06 | 474/134 |
| 2004/0087400 A1 * | 5/2004 | Youn | B41J 19/005 | 474/117 |
| 2004/0087401 A1 * | 5/2004 | Serkh | F16H 7/1218 | 474/134 |
| 2005/0079939 A1 * | 4/2005 | Simmons | F16H 7/14 | 474/101 |
| 2006/0217223 A1 * | 9/2006 | Schmid | F16H 7/1281 | 474/136 |
| 2008/0132365 A1 * | 6/2008 | Boussaguet | F16C 33/723 | 474/136 |
| 2009/0062046 A1 * | 3/2009 | Lindemann | F16H 7/1263 | 474/101 |
| 2011/0269586 A1 * | 11/2011 | Numajiri | F16H 7/1263 | 474/138 |
| 2015/0057117 A1 * | 2/2015 | Antchak | F16H 7/12 | 474/109 |
| 2015/0204425 A1 * | 7/2015 | Lindsay | F16M 11/2092 | 474/117 |
| 2015/0280514 A1 * | 10/2015 | Norris | F16H 7/14 | 474/115 |
| 2020/0340552 A1 * | 10/2020 | Koka | F16H 7/1281 | |
| 2020/0340553 A1 * | 10/2020 | Salunkhe | F16H 7/1281 | |
| 2020/0340554 A1 * | 10/2020 | Salunkhe | F16H 7/1281 | |

\* cited by examiner

TENSIONING SYSTEMS AND METHODS

BACKGROUND

Technical Field

The present disclosure relates generally to operational improvements to motor-driven systems and more particularly, but not by way of limitation, to tensioning systems and methods.

History of Related Art

Belts are often used as a source of motion, to transmit power efficiently, or to track relative movement. It is common for belt tension to decrease as belts wear. Although there are existing methods for tensioning belts, such methods are typically complicated and replete with opportunity for misuse. This misuse can result in improper tensioning, pulley misalignment, and other problems.

SUMMARY

In an embodiment, a tensioning apparatus includes a housing and a fastener extending at least partially through the housing. The apparatus also includes a trolley adjustably positioned within the housing about the fastener. The apparatus also includes a pulley disposed outside the housing and coupled to the trolley, where the pulley moves in unison with the trolley along an opening in the housing.

In an embodiment, a method of tensioning includes positioning a trolley within a housing about a fastener. The method also includes coupling a pulley to the trolley, where the pulley is disposed outside the housing. The method also includes adjusting the fastener, the pulley moving in unison with the trolley along an opening in the housing in response to the adjusting.

In an embodiment, a tensioning system includes a housing and a fastener extending at least partially through the housing. The tensioning system also includes a trolley adjustably positioned within the housing about the fastener. The tensioning system also includes a tensioning pulley disposed outside the housing and coupled to the trolley, where the tensioning pulley moves in unison with the trolley along an opening in the housing. The tensioning system also includes a motor having a motor pulley coupled thereto. The tensioning system also includes a motor-driven system having a drive pulley coupled thereto. The tensioning system also includes a belt linking the motor pulley and the drive pulley, where the tensioning pulley engages the belt at a point between the motor pulley and the drive pulley and supplies tension for the belt.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Still further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1A:
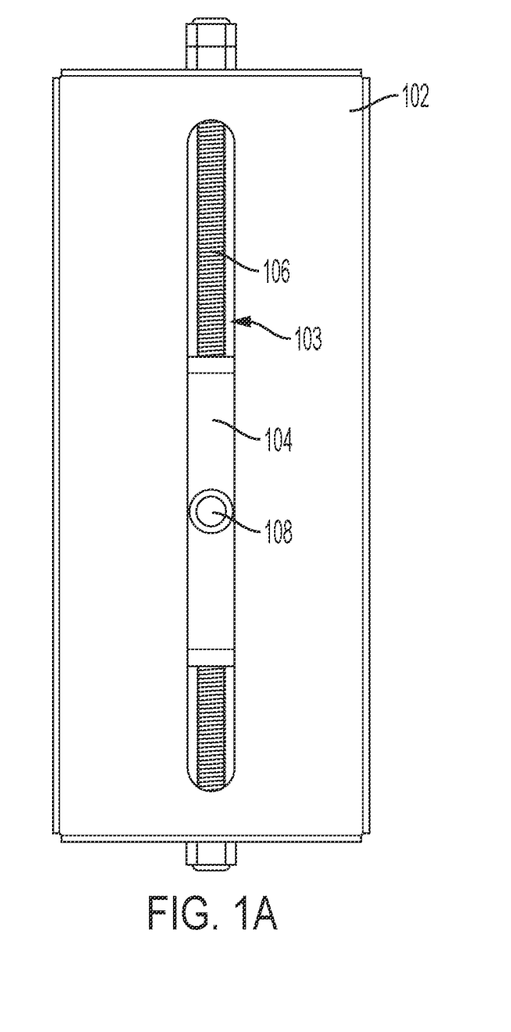
FIGS. 1A-B are front views of an exterior of a tensioning apparatus.
Figure 1B:
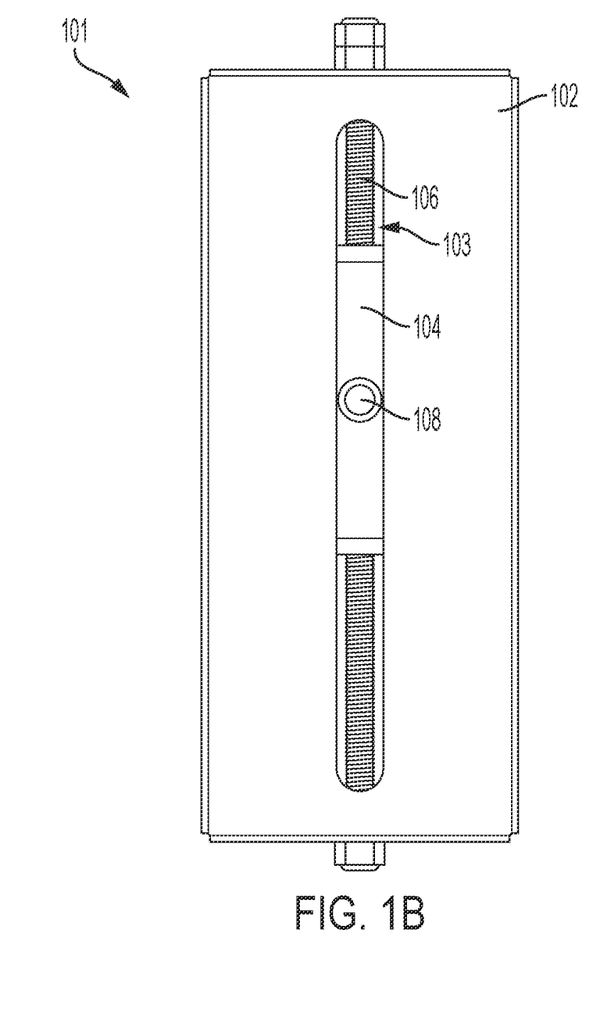

FIGS. 1A-B are front views of an exterior of a tensioning apparatus 101. In certain embodiments, the tensioning apparatus 101 is operable to supply tension, for example, for a belt or chain in a belt or chain-driven system, such as a system including a belt or chain linking a motor to another system element driven by such motor. The tensioning apparatus 101 includes a housing 102, a trolley 104, and a fastener 106.

The trolley 104 is adjustably positioned within the housing 102 about, or around, the fastener 106. In general, the fastener 106 extends at least partially through the housing 102 in order to facilitate adjustment of the trolley 104. In the embodiment and orientation shown in FIGS. 1A-B, the fastener 106 is a bolt that extends vertically through an entirety of the housing 102. However, it should be appreciated that the fastener 106 can be substituted with any other type of fastener, such as another suitable threaded member, with the fastener 106 being secured to the housing 102 in any suitable fashion.

Still with reference to FIGS. 1A-B, the trolley 104 includes an attachment point 108 for securing a pulley that engages, for example, a belt or chain for purposes of supplying tension. The attachment point 108 can be, for example, a threaded hole or other opening configured to receive a fastener, such as a bolt, that secures the pulley to the trolley 104. The tensioning apparatus 101 is shown in FIGS. 1A-B without a pulley in order to better illustrate the trolley 104. An example with a pulley will be described relative to FIGS. 2A-B.

Still with reference to FIGS. 1A-B, the trolley 104 is adjustable within the housing 102 along an opening 103 in the housing 102 by applying force to the fastener 106 in either a tightening direction or a loosening direction. The opening 103 can be, for example, a slot that extends substantially parallel to the fastener 106. In various embodiments, when a pulley is coupled to the trolley 104 via the attachment point 108 as described above, the fastener 106 can be tightened to a target torque (e.g., 8-12 inch-pounds) in order to supply configurable tension for a belt or chain via the pulley. In certain embodiments, once the target torque is reached, the fastener 106 can serve as a lockdown bolt, for example, that is secured to the housing 102 (e.g., via a nut) to prevent assembly loosening during operation. The pulley moves in unison with the trolley 104 along the opening 103 to supply the tension. In this manner, the opening 103 can be, or serve as, a slide along which the pulley moves for positional adjustment.

Still with reference to FIGS. 1A-B, in various embodiments, the trolley 104 can rise or lower in response to corresponding adjustment of the fastener 106. For example, if FIGS. 1A and 1B are treated as depicting starting and adjusted positions, respectively, with reference to FIG. 1A, force can be applied to the fastener 106 in a tightening direction to lift or raise the trolley 104 to the position shown in FIG. 1B, with the raised position supplying increased tension. It should be appreciated that the fastener 106 can also be used in reverse fashion to decrease tension. For example, if FIG. 1B is treated as representing a starting position and FIG. 1A is treated as representing an adjusted position, with reference to FIG. 1B, force can be applied to the fastener 106 in a loosening direction to drop or lower the trolley 104 to the position shown in FIG. 1A, with the lowered position supplying decreased tension.

Figure 2A:
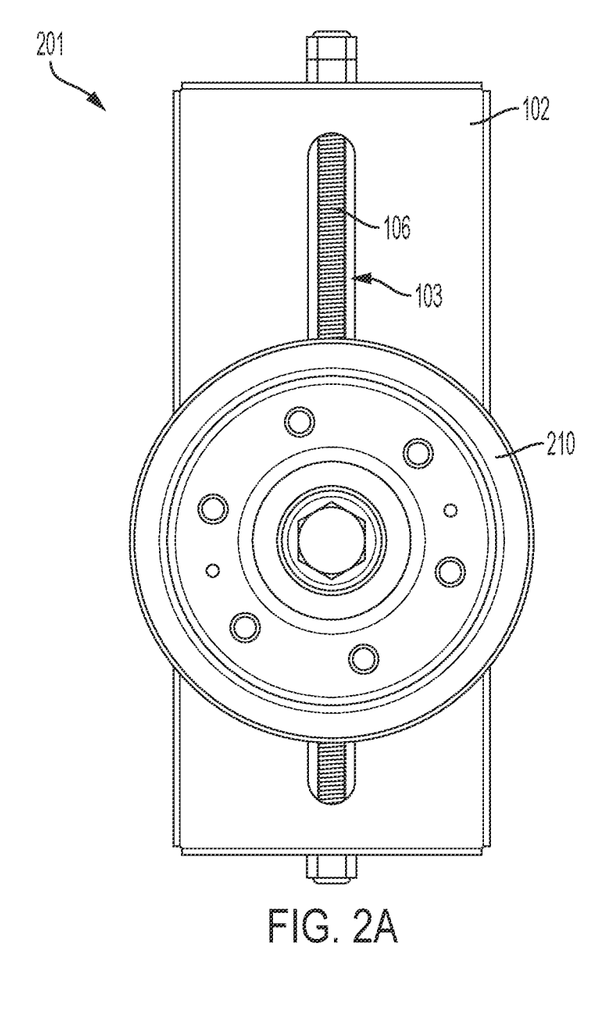
FIGS. 2A-B are front views of an exterior of a tensioning apparatus with a pulley coupled thereto.
Figure 2B:
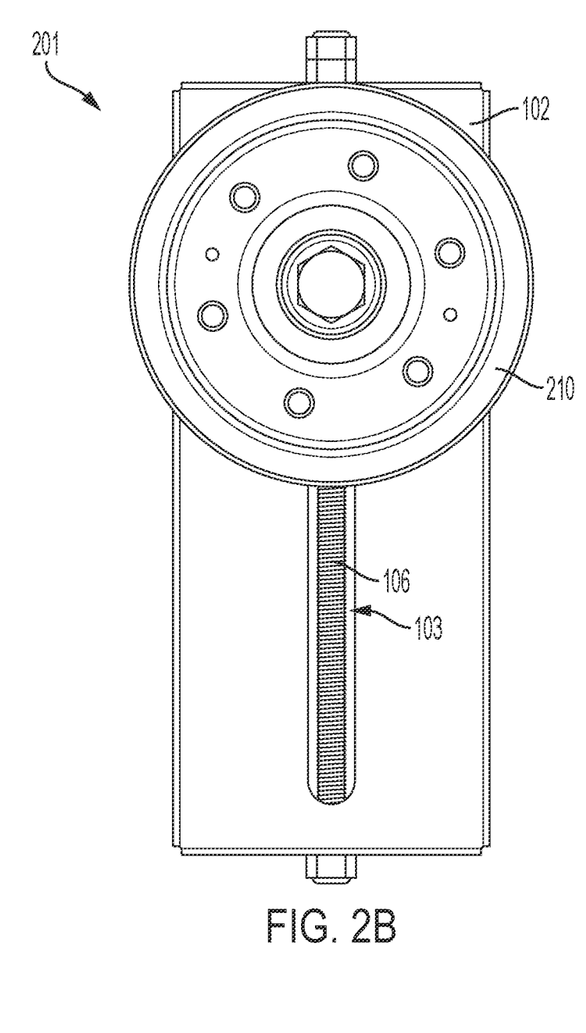

FIGS. 2A-B are front views of an exterior of a tensioning apparatus 201 with a pulley 210 coupled thereto. In general, the tensioning apparatus 201 corresponds to the tensioning apparatus 101 after the pulley 210 has been coupled to the attachment point 108 shown in FIG. 1. As described above, the fastener 106 can be tightened to a target torque (e.g., 8-12 inch-pounds) in order to supply configurable tension for a belt or chain via the pulley 210. The pulley 210 moves in unison with the trolley 104 along the opening 103 to supply the tension. The opening 103 can be, or serves as, a slide along which the pulley 210 moves for positional adjustment.

Still with reference to FIGS. 2A-B, in various embodiments, the pulley 210 can rise or lower in unison with the trolley 104 in response to corresponding adjustment of the fastener 106. For example, if FIGS. 2A and 2B are treated as depicting starting and adjusted positions, respectively, with reference to FIG. 2A, force can be applied to the fastener 106 in a tightening direction to lift or raise the pulley 210 to the position shown in FIG. 2B, with the raised position supplying increased tension. As described previously, it should be appreciated that the fastener 106 can also be used in reverse fashion to decrease tension. For example, if FIG. 2B is treated as representing a starting position and FIG. 2A is treated as representing an adjusted position, with reference to FIG. 2B, force can be applied to the fastener 106 in a loosening direction to drop or lower the pulley 210 to the position shown in FIG. 2A, with the lowered position supplying decreased tension.

Figure 3A:
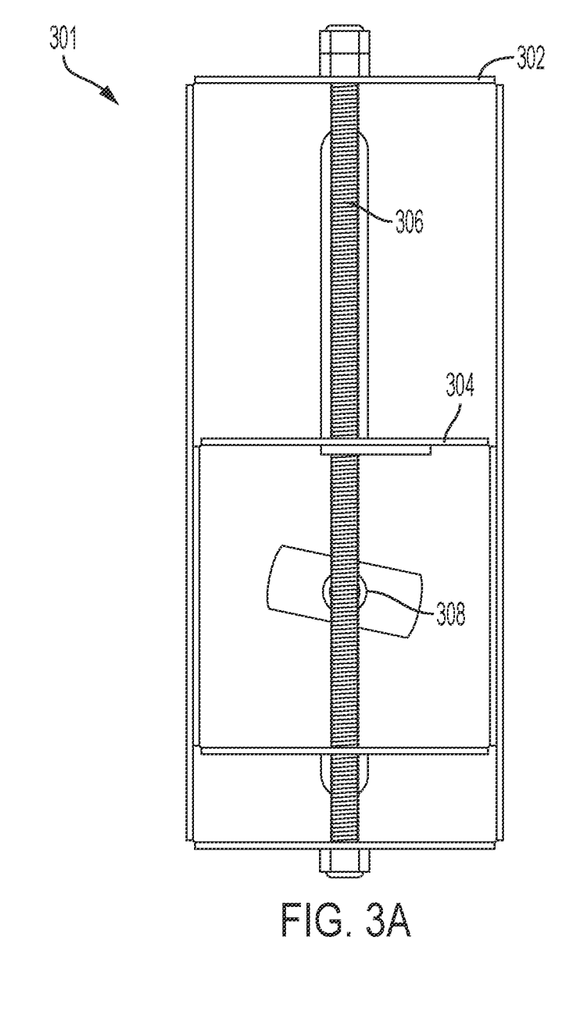
FIGS. 3A-B are rear views of an interior of a tensioning apparatus.
Figure 3B:
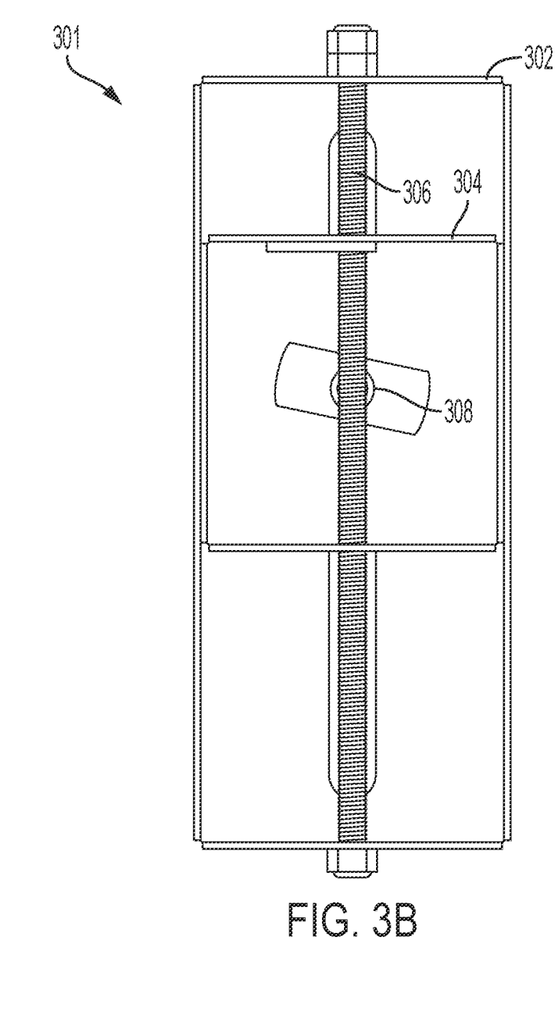

FIGS. 3A-B are rear views of an interior of a tensioning apparatus 301. In some embodiments, the tensioning apparatus 301 can correspond to the tensioning apparatus 101 of FIGS. 1A-B and/or the tensioning apparatus 201 of FIGS. 2A-B. In particular, the tensioning apparatus 301 includes a housing 302, a trolley 304, and a fastener 306 that are generally arranged and configured to operate as described relative to the housing 102, the trolley 104, and the fastener 106, respectively, of FIGS. 1A-B and 2A-B. The trolley 304 includes an attachment point 308 similar to the attachment point 108 of FIGS. 1A-B, with the attachment point 308 being shown from a rear perspective in FIGS. 3A-B.

Still with reference to FIGS. 3A-B, in various embodiments, the trolley 304 can rise or lower in response to corresponding adjustment of the fastener 306. For example, if FIGS. 3A and 3B are treated as depicting starting and adjusted positions, respectively, with reference to FIG. 3A, force can be applied to the fastener 306 in a tightening direction to lift or raise the trolley 304 to the position shown in FIG. 1B, with the raised position supplying increased tension via a pulley coupled to the attachment point 308 in the fashion shown and described relative to FIGS. 2A-B. It should be appreciated that the fastener 306 can also be used in reverse fashion to decrease tension. For example, if FIG. 3B is treated as representing a starting position and FIG. 3A is treated as representing an adjusted position, with reference to FIG. 3B, force can be applied to the fastener 306 in a loosening direction to drop or lower the trolley 304 (and a pulley coupled thereto) to the position shown in FIG. 3A, with the lowered position supplying decreased tension.

Figure 4A:
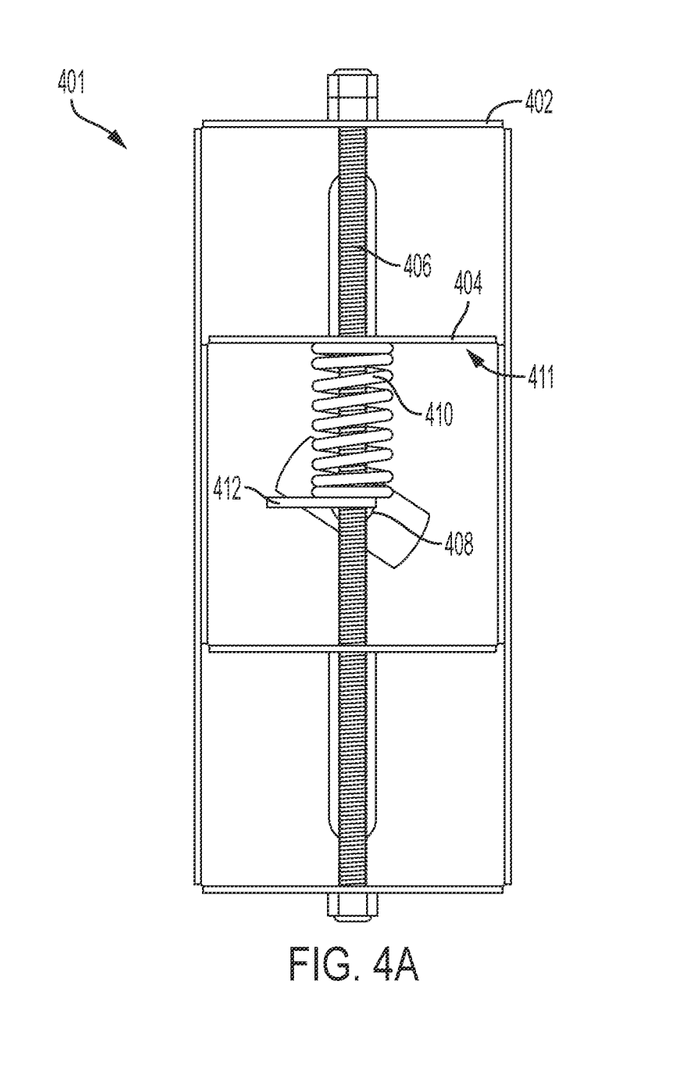
FIGS. 4A-B are rear views of an interior of a tensioning apparatus.
Figure 4B:
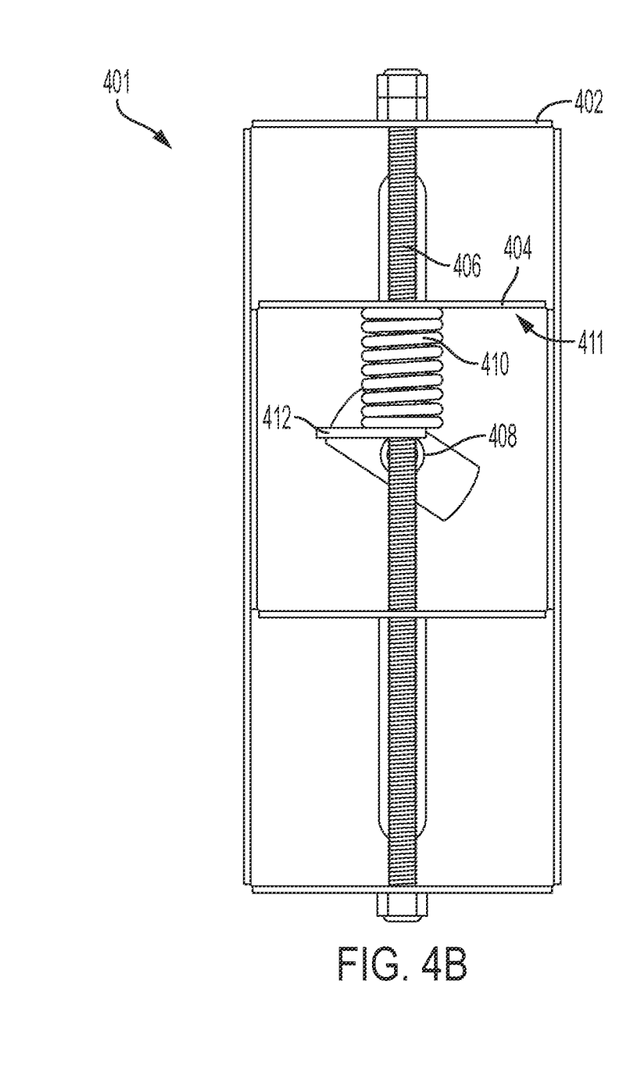

FIGS. 4A-B are rear views of an interior of a tensioning apparatus 401. In some embodiments, the tensioning apparatus 401 can correspond to the tensioning apparatus 101 of FIGS. 1A-B and/or the tensioning apparatus 201 of FIGS. 2A-B. In particular, the tensioning apparatus 401 includes a housing 402, a trolley 404, and a fastener 406 that are generally arranged and configured to operate as described relative to the housing 102, the trolley 104, and the fastener 106, respectively, of FIGS. 1A-B and 2A-B. The trolley 404 includes an attachment point 408 similar to the attachment point 108 of FIGS. 1A-B, with the attachment point 408 being shown from a rear perspective in FIGS. 4A-B.

In contrast to the tensioning apparatus 301 of FIGS. 3A-B, the tensioning apparatus 401 includes a spring 410 and a plate 412. The plate 412 is disposed about the fastener 406 inside the trolley 404. The plate 412 can be, for example, a nut plate or threaded body with flanges. The spring 410 is disposed about the fastener 406 between the plate 412 and a top interior surface 411 of the trolley 404. In a typical embodiment, the spring 410 compresses between the plate 412 and the top interior surface 411 in response to force applied to the fastener 406 in a tightening direction. In similar fashion, in a typical embodiment, the spring 410 decompresses in response to force applied to the fastener 406 in a loosening direction.

In various embodiments, when the spring 410 is compressed between the plate 412 and the top interior surface 411 of the trolley 404, the spring 410 preserves a position of the trolley 404 and the pulley coupled thereto against movement in a direction opposite the direction of compression of the spring 410. In particular, in the example of FIGS. 4A-B, the spring 410 preserves the position of the trolley 404 and the pulley coupled thereto against downward movement, or slipping, by applying opposite upward force within an elasticity limit of the spring 410. In this way, downward force or slipping of the trolley 404 and the pulley coupled thereto is typically prevented, or compensated for by counterforce from the spring 410, until the spring 410 is fully decompressed. Tension applied via tightening of the fastener 406 is thereby preserved subject to the elasticity limit of the spring 410. Advantageously, in certain embodiments, as a belt or chain to which tension is applied wears, the spring 410, when compressed, provides consistent tension for the life of the belt or chain.

Still with reference to FIGS. 4A-B, in various embodiments, the trolley 404 can rise or lower in response to corresponding adjustment of the fastener 306. Additionally, in various embodiments, the spring 410 can compress or decompress in response to corresponding adjustment of the fastener 406. For example, if FIGS. 4A and 4B are treated as depicting starting and adjusted positions, respectively, with reference to FIG. 4A, force can be applied to the fastener 306 in a tightening direction to both raise the trolley 304 to the position shown in FIG. 1B and compress the spring 410 between the plate 412 and the top interior surface 411 of the trolley 404. As described previously, the raised position can supply increased tension via a pulley coupled to the attachment point 408 in the fashion shown and described relative to FIGS. 2A-B, and the compressed spring 410 can preserve such position. It should be appreciated that the fastener 406 can also be used in reverse fashion to decompress the spring 410 and thereafter decrease tension. For example, if FIG. 4B is treated as representing a starting position and FIG. 4A is treated as representing an adjusted position, with reference to FIG. 4B, force can be applied to the fastener 406 in a loosening direction to decompress the spring 410 such that, after the spring is fully decompressed, further force in the loosening direction causes the trolley 404 (and a pulley coupled thereto) to be dropped or lowered to the position shown in FIG. 4A, with the lowered position supplying decreased tension.

Figure 5A:
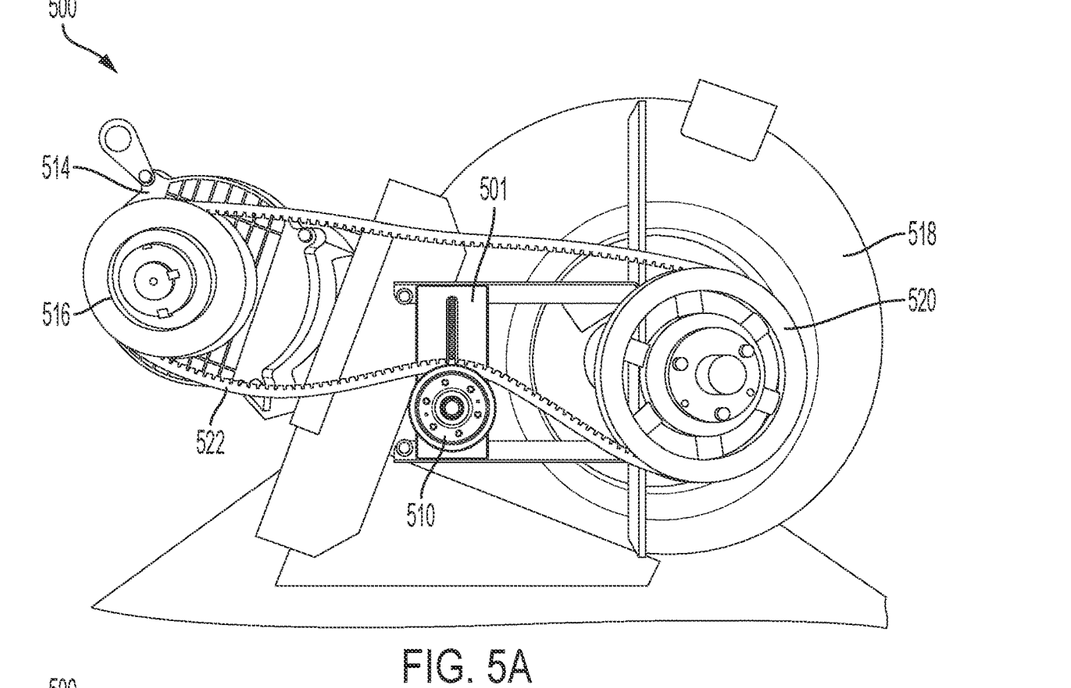
FIGS. 5A-B illustrate an example of a tensioning system.
Figure 5B:
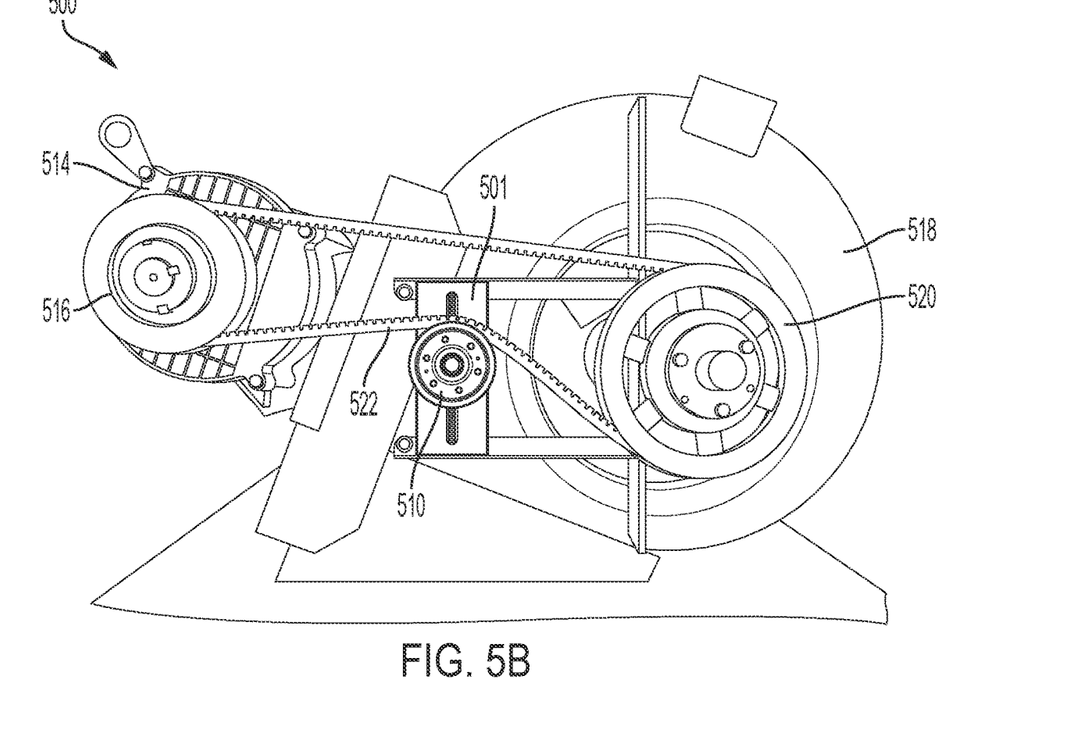

FIGS. 5A-B illustrate an example of a tensioning system 500. The tensioning system 500 includes a tensioning apparatus 501 having a tensioning pulley 510, a motor 514 having a motor pulley 516, a motor-driven system 518 having a drive pulley 520, and a belt 522. In various embodiments, the motor-driven system 518 can be, for example, a blower in a heating, ventilation, and air conditioning (HVAC) system.

The belt 522 links the motor pulley 516 and the drive pulley 520, for example, by being looped around each of the motor pulley 516 and the drive pulley 520. The tensioning pulley 510 engages the belt 522 at a point between the motor pulley 516 and the drive pulley 520 and supplies tension for the belt 522. Although FIGS. 5A-B describe the belt 522 for purposes of illustration, it should be appreciated that the same principles are applicable to chains or other drive mechanisms.

In general, the tensioning apparatus 501 can correspond to the tensioning apparatus 101 of FIGS. 1A-B, the tensioning apparatus 201 of FIGS. 2A-B, the tensioning apparatus 301 of FIGS. 3A-B, and/or the tensioning apparatus 401 of FIGS. 4A-B. For example, if the tensioning apparatus 501 corresponds to the tensioning apparatus 301 of FIGS. 3A-B, the tensioning apparatus 501 can be adjusted in the fashion described relative to FIGS. 3A-B to increase or decrease tension of the belt 522. By way of further example, if the tensioning apparatus 501 corresponds to the tensioning apparatus 401 of FIGS. 4A-B, the tensioning apparatus 501 can further preserve a position of the pulley 510, and the tension applied to the belt 522, in the fashion described relative to FIGS. 4A-B.

Still with reference to FIGS. 5A-B, in various embodiments, the pulley 510 can rise or lower in the fashion described relative to FIGS. 1A-B, 2A-B, 3A-B, and/or 4A-B. FIG. 5A shows the pulley 510 in a lowered position while FIG. 5B shows the pulley 510 in a raised position. As shown, the raised position of the pulley 510 shown in FIG. 5B supplies increased tension for the belt 522 as compared to the lowered position of the pulley 510 shown in FIG. 5A.

In various embodiments, the tensioning system 500 can provide a number of operational advantages. For example, in certain embodiments, the tensioning apparatus 501 is simple to adjust via a single fastener. In another example, the tensioning apparatus 501, due to its design and adjustment simplicity, can prevent pulley misalignment due to improper tensioning. In general, the design and adjustment simplicity of the tensioning apparatus 501 also makes the apparatus more forgiving of minor pulley misalignment that can happen from improper installation in the factory, for example (e.g., misalignment of the motor 514 and the motor-driven system 518). Further, in various embodiments, the tensioning apparatus 501 can serve as a drop-in replacement for an existing tensioning apparatus.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments, are possible in which these tasks are performed by a different entity.

Conditional language used herein, such as, among others, "can," "might," "may," "e.g.,," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A tensioning apparatus comprising:
a housing;
a fastener extending through an entirety of the housing
a trolley adjustably positioned within the housing about the fastener; and
a pulley disposed outside the housing and coupled to the trolley, wherein the pulley moves in unison with the trolley along an opening in the housing;
wherein the trolley and the pulley move in unison along the opening in the housing in response to adjustment of the fastener;
a plate disposed about the fastener inside the trolley; and
a spring disposed about the fastener between the plate and an interior surface of the trolley.

2. The tensioning apparatus of claim 1, wherein the spring compresses between the plate and the interior surface in response to force applied to the fastener in a tightening direction.

3. The tensioning apparatus of claim 2, wherein, when the spring is compressed, the spring preserves a position of the trolley and the pulley against movement in a direction opposite a direction of compression.

4. The tensioning apparatus of claim 3, wherein the spring preserves the position of the trolley and the pulley against downward movement.

5. The tensioning apparatus of claim 1, wherein the opening comprises a slide that extends substantially parallel to the fastener.

6. The tensioning apparatus of claim 1, wherein the fastener comprises a threaded member that extends through an entirety of the housing.

7. The tensioning apparatus of claim 1, comprising a belt disposed along the pulley, wherein the pulley supplies tension for the belt.

8. A method of tensioning, comprising:
positioning a trolley within a housing about a fastener that extend through an entirety of the housing;
positioning a trolley within a housing about a fastener;
coupling a pulley to the trolley, wherein the pulley is disposed outside the housing;
adjusting the fastener, the pulley moving in unison with the trolley along an opening in the housing in response to the adjusting; and
wherein a spring and a plate are each disposed about the fastener inside the trolley.

9. The method of claim 8, wherein the adjusting comprises applying force to the fastener in a tightening direction, the spring compressing between the plate and an interior surface of the trolley in response to the force in the tightening direction.

10. The method of claim 9, wherein the compressed spring preserves a position of the trolley and the pulley against movement in a direction opposite a direction of compression.

11. The method of claim 9, comprising applying force to the fastener in a loosening direction, the spring decompressing in response to the force in the loosening direction.

12. The method of claim 9, wherein the applying force to the fastener in the tightening direction comprises supplying increased tension for a belt disposed along the pulley.

13. A tensioning system, comprising:
a housing;
a fastener extending through an entirety of the housing;
a trolley adjustably positioned within the housing about the fastener;
a tensioning pulley disposed outside the housing and coupled to the trolley, wherein the tensioning pulley moves in unison with the trolley along an opening in the housing;
a motor comprising a motor pulley coupled thereto;
a motor-driven system comprising a drive pulley coupled thereto;
a belt linking the motor pulley and the drive pulley, wherein the tensioning pulley engages the belt at a point between the motor pulley and the drive pulley and supplies tension for the belt; and
wherein the motor-driven system comprises a blower for a heating, ventilation, and air conditioning (HVAC) system.

14. The tensioning system of claim 13, wherein the trolley and the tensioning pulley move in unison along the opening in the housing in response to adjustment of the fastener.

15. The tensioning system of claim 13, comprising:
a plate disposed about the fastener inside the trolley; and
a spring disposed about the fastener between the plate and an interior surface of the trolley, wherein the spring compresses between the plate and the interior surface in response to force applied to the fastener in a tightening direction.

16. The tensioning system of claim 15, wherein, when the spring is compressed, the spring preserves a position of the trolley and the tensioning pulley against movement in a direction opposite a direction of compression.

* * * * *

UNITED STATES PATENT AND TRADEMARK OFFICE
CERTIFICATE OF CORRECTION

PATENT NO. : 11,536,350 B1
APPLICATION NO. : 17/359881
DATED : December 27, 2022
INVENTOR(S) : Jacob Long et al.

It is certified that error appears in the above-identified patent and that said Letters Patent is hereby corrected as shown below:

In the Claims

Claim 8, Column 7, Lines 46-50    Replace "positioning a trolley within a housing about a fastener that extend through an entirety of the housing; positioning a trolley within a housing about a fastener; coupling a pulley to the trolley, wherein the pulley is disposed outside the housing;" with
--positioning a trolley within a housing about a fastener that extends through an entirety of the housing; coupling a pulley to the trolley, wherein the pulley is disposed outside the housing;--

Signed and Sealed this
Eleventh Day of April, 2023

Katherine Kelly Vidal
Katherine Kelly Vidal
*Director of the United States Patent and Trademark Office*